United States Patent
Duncan

(10) Patent No.: US 6,944,129 B1
(45) Date of Patent: Sep. 13, 2005

(54) MESSAGE FORMAT AND FLOW CONTROL FOR REPLACEMENT OF THE PACKET CONTROL DRIVER/PACKET INTERFACE DUAL PORT RAM COMMUNICATION

(75) Inventor: Charles R. Duncan, Thornton, CO (US)

(73) Assignee: Avaya Technology Corp., Basking Ridge, NJ (US)

(*) Notice: Subject to any disclaimer, the term of this patent is extended or adjusted under 35 U.S.C. 154(b) by 1021 days.

(21) Appl. No.: 09/596,826

(22) Filed: Jun. 19, 2000

(51) Int. Cl.[7] ............................................. H04L 12/26
(52) U.S. Cl. ....................... 370/236; 370/420; 370/429
(58) Field of Search ................................. 370/412, 417, 370/420, 421, 428, 429, 230, 235, 236, 236.1, 370/236.2

(56) References Cited

U.S. PATENT DOCUMENTS 5,274,634 A * 12/1993 Babiarz ...................... 370/422
6,167,054 A * 12/2000 Simmons et al. ........... 370/422

OTHER PUBLICATIONS

Ohba, H. et al., 'On the Packet-Interleaved Interface Between Packet-Switched Network and Computers', IEEE Transactions on Communications, Oct. 1974, pp. 1671-1675.*

Brinkerhoff et al.; "Quantum Flow Control"; published Mar. 26, 1997; 90 pps.

* cited by examiner

Primary Examiner—Melvin Marcelo
(74) Attorney, Agent, or Firm—Sheridan Ross P.C.

(57) ABSTRACT

The architecture of the present invention provides a new message set and/or flow control mechanism and a networked architecture for managing telecommunication devices such as telephones, fax, voicemail, e-mail, and other communication endpoints. The new message set and flow control mechanism maps to existing (conventional) dual port RAM queues, tables, interrupts, and other memory locations, thus removing hardware dependency on the packet control driver/packet interface communications and allowing control of LAPD links to be remoted.

52 Claims, 7 Drawing Sheets

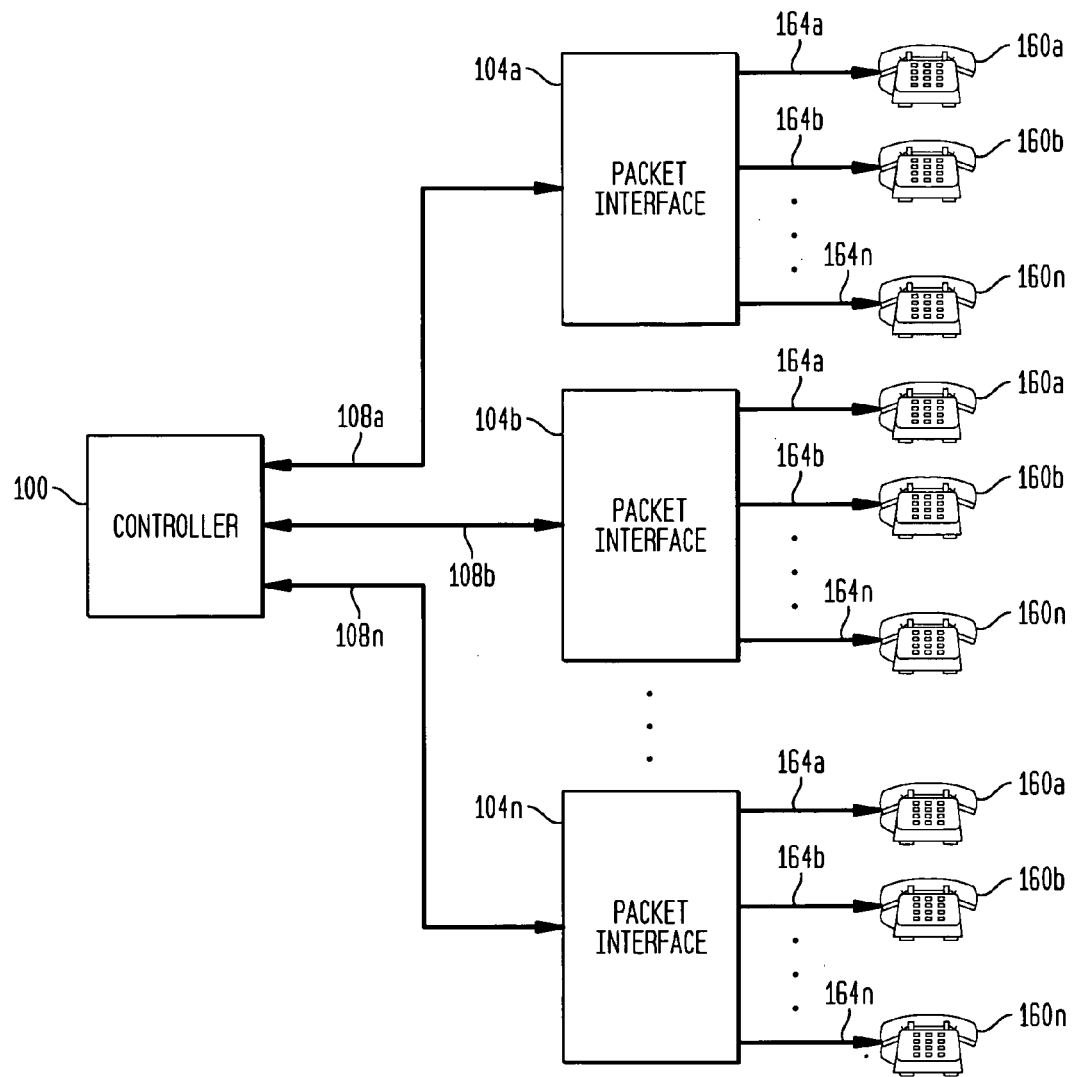

MESSAGE FORMAT AND FLOW CONTROL FOR REPLACEMENT OF THE PACKET CONTROL DRIVER/PACKET INTERFACE DUAL PORT RAM COMMUNICATION

FIELD OF THE INVENTION

The present invention relates generally to telecommunication systems and specifically to a system including a packet control driver and packet interface and its method of operation.

BACKGROUND OF THE INVENTION

Telecommunication contractor switching centers, such as used in a private branch or automatic exchange, use a variety of architectures to handle contacts. In one configuration depicted in FIG. 1 and sold by Lucent Technologies, Inc., under the tradename Definity™, the switching center includes a controlling architecture 10 that includes a processor 14, a memory 18, and a packet control driver 22; a packet interface 26 that includes a processor 30 and memory 34; dual port RAM 36 that includes tables 38 (e.g., link address table, link control table, link data table, link status table, etc.), queues 42, and variables such as counters 46 and interrupts 50; one or more memory (ISDN) boards 54 (which are attached to the packet interface by way of packet bus 58); and telephones 62(which are attached to the boards 54 by link access procedure for the D-channel (LAPD) links). A "link" refers to any kind of communication path between two computational components. The packet interface 26 and dual port RAM 36 are typically located on a common board 66 while the controlling architecture 10 is located on a separate board in the same enclosure.

The packet control driver and packet interface communicate with one another by means of the dual port RAM. As will be appreciated, the packet control driver 22 includes software that controls the packet interface 26 and provides interfaces to application software in the architecture 10 for accessing the packet interface's capabilities. The packet interface 26 terminates LAPD and includes firmware that interfaces to the packet bus 58 through various known devices. The controlling architecture 10 and packet interface 26 each access the dual port RAM 36 via memory buses 68a,b. In this manner, both the packet control driver 22 and packet interface 26 access the same memory locations when they are communicating with one another. To provide direct control of the packet interface, one or more interrupt lines 70 connect the architecture 10 directly to the packet interface 26.

The architecture has certain limitations. For example, the distance of separation between the architecture 10 and the packet interface 26 must be relatively small. The close proximity of the two components results from the requirement that the architecture 10 access the dual port RAM 36 via a memory bus 68a and from the flow control technique employed by the architecture 10 and packet interface 26. The architecture 10 and packet interface 26 employ a simple, escalating XON/XOFF flow control technique that is not optimal in an environment where the two entities are a variable distance apart and each message could have a variable (>0) amount of delay. The separation distance limitation restricts the versatility of the system. By way of illustration, for the controlling architecture 10 to control multiple port networks (each port network including a packet interface 26, one or memory boards 54, and attached telephones 62) a first Expansion Interface (EI) board is connected to the packet bus 58 and to a second EI board, and the second EI board is connected to a packet bus 58 of another port network (not shown). As can be seen from the illustration, a large number of boards are employed to increase contact center capacity which increases the cost of the system, and all port network messages are routed inefficiently through a single packet bus 58 of a selected port network.

SUMMARY OF THE INVENTION

These and other needs are addressed by the architectures and methods of the present invention. Generally, the present invention provides a new message set and/or flow control mechanism and a networked architecture for managing telecommunication devices such as telephones, voicemail, e-mail, fax, and other communication end points. The new message set and flow control mechanism maps to existing (conventional) dual port RAM queues, tables, interrupts, and other memory locations, thus removing hardware dependency on the packet control driver/packet interface communications and allowing control of LAPD links to be remoted.

In one embodiment, a method for controlling a telecommunications system is provided that includes the steps of:

(a) transmitting over a network line a message or packet from a controller to a communication interface or from the interface to the controller, the message including a message identifier and data; and (b) processing the data in a predetermined manner based on the message identifier. The controller is typically a packet control driver and interface a packet interface. As used herein, a "controller" refers to a communication device controlling entity, "communication interface" to any communication device interface, and a "network" to a set of computers (e.g., processor and memory) connected together such as by any communication path, e.g., a wire, cable, or other energy conductor, the ethernet, wireless connection, etc.

In one configuration, the message identifier identifies at least one of a type and index corresponding to a message. The identifier can be an alphabetical, a numeric, and/or an alphanumeric symbol and is typically a numeric or alphanumeric symbol.

In this configuration, queues, tables, interrupts, or other variables in the dual port RAM of a conventional system are mapped to a corresponding message type and index. Both the controller, e.g., packet control driver, and interface, e.g., packet interface, maintain a copy of all of the queues, tables, interrupts, and other variables that are normally stored in the dual port RAM in a conventional system. When the variables are written to the memory accessed by a packet control driver or to the memory of a packet interface, a message is sent to the other of the packet control driver and packet interface with the appropriate type and index to indicate what has changed. If a data packet needs to be sent by the packet control driver or packet interface (which was previously done by a queue in the dual port RAM), a message is created with a type and index corresponding to the queue that the packet would normally been placed in (in a conventional system) and is then sent to the other of the packet control driver and packet interface. Upon receipt, the message is written into a queue accessed by the other of the packet control driver or packet interface. This methodology effectively moves the packet control driver/packet interface communications out of dual port RAM and, by sending the message set over a serial stream, packet control driver/ packet interface communication dependency on hardware is removed and simplified, thereby reducing costs.

Examples of types and/or indexes of messages include a flow control message (e.g., including a record field set to a number of update records held by the message, a link or link grouping identification field, and an ack field including a number of packets that have been acknowledged for each link identifier since the last flow control message was transmitted/received), a fault code message, a counter value message (e.g., a request for a counter value and/or a response to such a request), an initialization message (e.g., a message providing initialization information including configuration information), a link update message (e.g., a message conveying link- (e.g., uplink- and/or downlink-) related information), a command message (e.g., a message conveying commands to the packet interface), a response message (e.g., a message other than the foregoing that conveys responses to the packet control driver) and/or a control message (a message other than the foregoing such as control and/or status messages that provide, e.g., active/standby bits, test bits, timeout bits, interrupt bits, board status bits, self test bits, and/or display control bits, etc., refresh messages, and the like). As will be appreciated, the predetermined manner of processing the data depends upon the specific type and/or index of message.

The transmission of the messages over the network between the packet control driver and packet interface is typically performed using a protocol stack. The protocol stack generally includes packet control driver/packet interface header information in an intermodule link header as well as a transmission control protocol header (TCP), Internet protocol (IP) header, and/or ethernet header. The various headers are typically added or removed by various handlers. As will be appreciated, a standard protocol, such as TCP, and the flow control mechanism of that protocol may not be effective in a networked telecommunications architecture because each LAPD link needs to be throttled individually. In the present invention, each link is controlled over a single connection (e.g., a socket, datagram, and/or other communication means) using the message type and index to complement the protocols used between the driver and packet interface The use of the protocol(s) for communications between the interface and driver provides the advantages corresponding with a standard transportation protocol while still being able to control individual LAPD links remotely (using a different protocol).

In another embodiment, a highly versatile telecommunications system is provided that includes:
(a) means (e.g., a controller, such as a packet control driver, a data controller, etc.) for controlling a plurality of telecommunications subsystems, each telecommunications subsystem including:
  (i) a plurality of telecommunications devices (e.g., telephones, fax, voicemail, e-mail, and/or other communication device) and
  (ii) one or more interface means (e.g., a communications interface such as a packet interface, a device interface, and/or other communication interfaces) for interfacing between the plurality of telecommunication devices and the controlling means; and
(b) network means (e.g., communications lines in a local area network (LAN) or wide area network (WAN)) for networking the controlling means with each of the telecommunications subsystems.

The architecture can have advantages in addition to those set forth above. In one configuration, the interface means such as a packet interface is always subservient to the controller such as a packet control driver and will accept whatever parameters the controlling means or controller sends the interface means. This structure has benefits including a faster setup time, greater control of the flow control mechanism by the controlling means, thereby permitting faster changes in buffer allocation strategies, and reductions in the workload of the interface means through removal from the interface means of responsibility for buffer management. In another configuration, the controlling means or controller is located at one geographic location and each of the telecommunication subsystems are at a plurality of other geographic locations remote from the location of the controller and/or the locations of the other subsystems.

In another embodiment, a novel flow control method for operating a telecommunications system is provided that includes:
(a) receiving a message from a telecommunication component (e.g., a call processor, endpoint manager, and/or resource controller);
(b) determining whether a memory capacity assigned to a grouping of links is sufficient to contain the message; and
(c) transmitting the message when the memory capacity is sufficient to contain the message.

In one configuration, the method includes the further steps of:
(e) determining whether a memory capacity assigned to a link is sufficient to contain a message;
(f) transmitting the message when both the memory capacity assigned to the grouping of links and the memory capacity assigned to the link are each sufficient to contain the message; and
(g) applying back pressure to the telecommunication component (e.g., software in a controller) when at least one of the memory capacity assigned to the grouping of links and the memory capacity assigned to the link are insufficient to contain the message.

In another embodiment, a method is provided to update the counters. The method includes the steps of:
(a) receiving a message; and
(b) at least one of incrementing or decrementing a counter in response to the message. As noted, the counter is related to the capacity of a memory accessed by a telecommunications component. The counter can be related to the grouping of links and/or an individual link. In one configuration, the links are grouped by link type, thus allowing buffer allocation and flow control parameters to be controlled on a per link type basis. This design can match the packet control driver/packet interface link control strategies of many conventional systems and allows flow control parameters to be distributed faster and more effectively.

In yet another embodiment, a buffer management method in a telecommunications system is provided that includes the steps of:
(a) determining whether a counter is the same as or exceeds a predetermined level, the counter being related to a memory capacity of a computational component;
(b) when the counter is the same as or exceeds the predetermined level, transmitting an update message to a second computational component; and
(c) when the counter is not the same as or in excess of the predetermined level, delaying the transmission of the update message to the second computational component. Before the determining step, an acknowledge message is typically received from a telecommunications device, such as a fax, voicemail, telephone, e-mail, and/or other communication devices. The counter can be incremented or decremented to indicate an unused (or used) portion of the memory capacity.

In yet a further embodiment, a flow control message format (e.g., for updating flow control counter(s)) is provided that includes:

(a) a first field for holding a link identifier for a specific link between telecommunications components;

(b) a second field for holding a group identifier for a grouping of links between telecommunications components;

(c) a third field for data corresponding to the link identifier; and (d) a fourth field for data corresponding to the group identifier. In one configuration, the message further includes a record field for a number of records contained in the message. In most applications, the data in the third and fourth fields relates to a number of packets that have been acknowledged by a telecommunication component.

The foregoing description of the various embodiments of the present invention is intended to be neither complete nor exhaustive. Those of ordinary skill in the art will appreciate that numerous other embodiments can be envisioned using one or more of the components set forth above. For example, a variety of systems can be envisioned for performing the method steps noted above.

BRIEF DESCRIPTION OF THE DRAWINGS

FIG. 9 is a schematic showing another call switching architecture according to another embodiment of the present invention.

DETAILED DESCRIPTION OF THE PREFERRED EMBODIMENT

Figure 2:
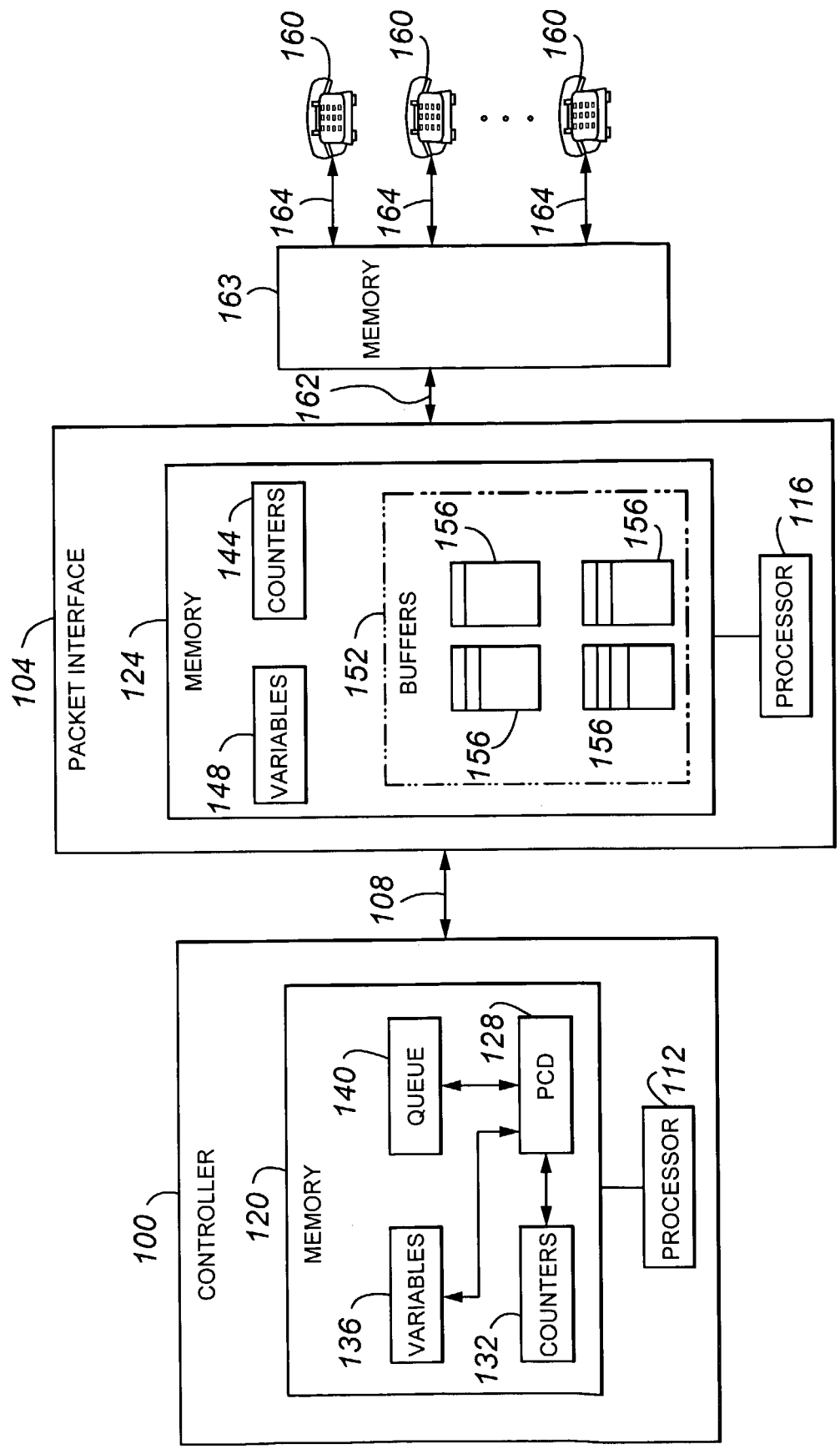
FIG. 2 is a schematic of a call switching architecture according to the present invention.

Referring to FIG. 2, a contact or call switching architecture according to an embodiment of the present invention is depicted. The architecture includes a controller 100 connected to a packet interface 104 via network line 108. The controller 100 and packet interface 104 respectively include a processor 112, 116 and memory 120, 124. Controller memory 120 includes a packet control driver 128, various counters 132 (which provide information on the operation of the packet interface), queue(s) 140 and other variables 136. Packet interface memory 124 includes counters 144, queues in buffers 152 and other variables 148. The queues 156 typically follow a first-in-first-out standard. The packet interface 104 is in turn connected memory (ISDN) board(s) 163 via a packet bus 162 and the memory (ISDN) board(s) 163 are in turn connected to telephones 160 via LAPD links 164. The packet interface 104 can be further connected to a primary rate interface (PRI) trunk (not shown) and one or more other boards (not shown) connected to various end points (not shown).

The variables 136, 148 in the controller and packet interface memories 120, 124, include tables (e.g., a link type table) (which provides link-type definitions), a link address table (which provides the translation information required to correctly route a packet through the switching network or the appropriate link), a link control or status table (which provides link status information), a link data table (which provides data reflecting the current uplink and downlink flow control state of each link on a selected port), etc.) and variables such as interrupts.

Figure 1:
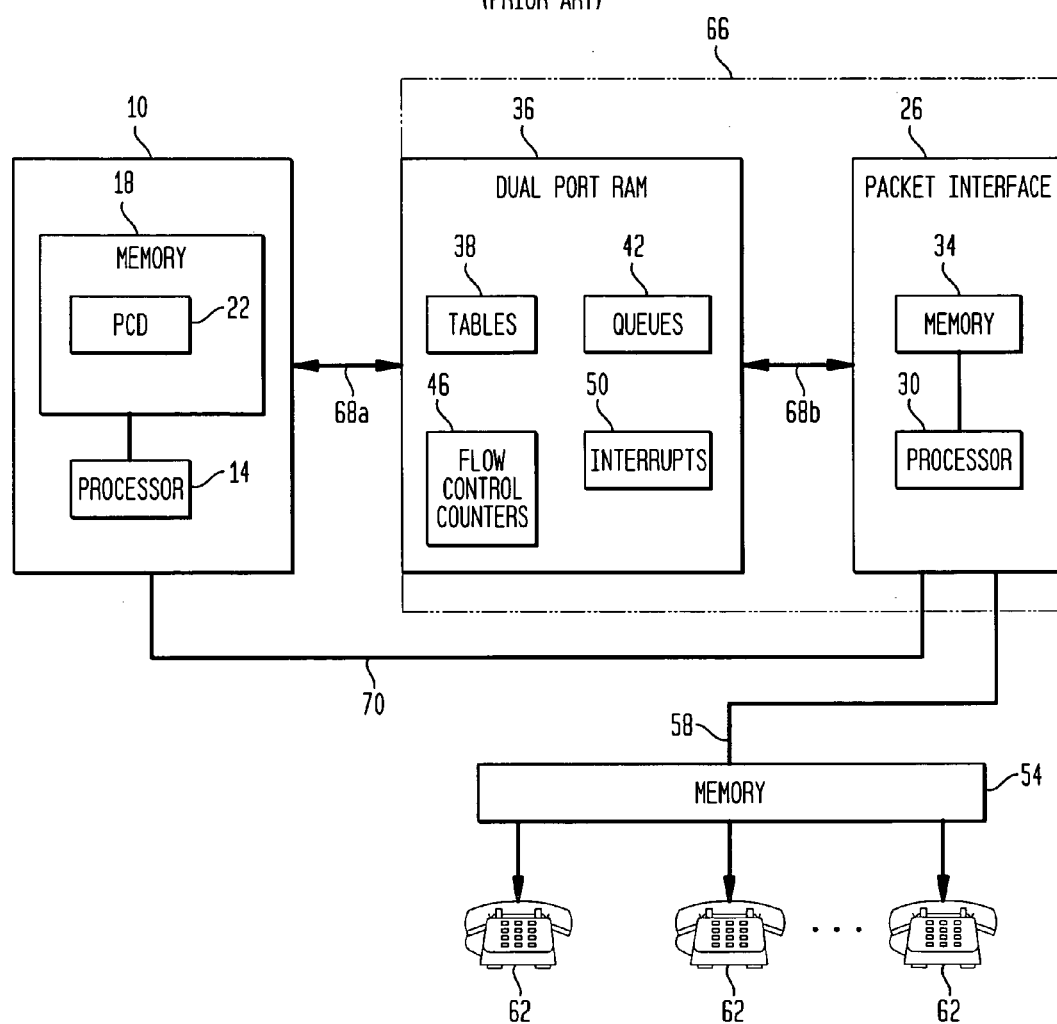
FIG. 1 is a schematic of a conventional call switching architecture.

In the system of FIG. 1, these variables as well as queues and counters, are contained in dual port RAM 36 and accessed by both the packet control driver 22 and packet interface 26. In contrast, these variables, queues, and counters are written to the memories of both the controller 100 and packet interface 104 in the present invention.

Figure 3:
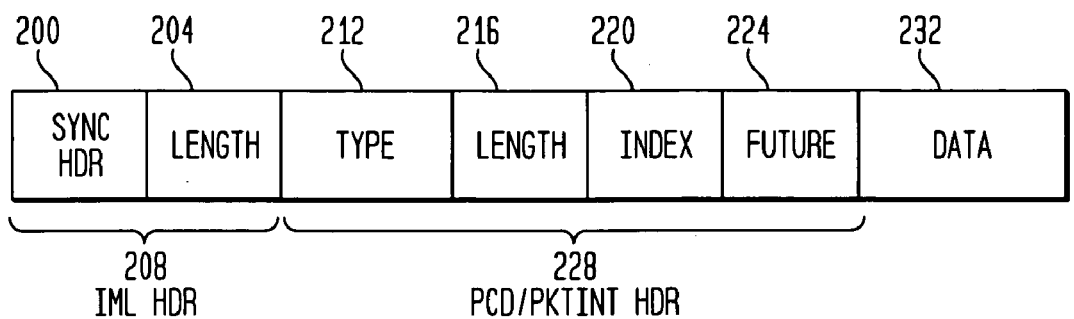
FIG. 3 depicts the structure of a network message in the call switching architecture of FIG. 2.

The packet control driver/packet interface communications are in accordance with the message control format of FIG. 3 which uses network byte ordering. The format includes a packet or sync information 200 and packet length 204 in the intermodule link or IML header 208 (which are typically in accordance with standard T-packet protocol), message type field 212, message length field 216, message index field 220, and future field 224 in the packet control driver/packet interface header 228, and data field 232. Examples of message types include those set forth above. The index field 220 of the header indicates which of the entries or variables in the pertinent memory 120, 124 are to be modified since some of the message structures include multiple entries or variables. Typically each identifier in the message type field 212 corresponds to one or more identifiers in the index fields 220. By way of example, a control message (which is a specific message type) has numerous subordinate index identifiers including, an index identifier referring to board reset bits, another to active/standby bits, another to test bits, another to timeout bits, another to interrupt bits, another to board status bits, another to self test bits, and another to display control bits. The future field is reserved for future use. The format of the data field 232 depends on the message type, but generally will follow the format of the data structure being sent.

Commands from the packet control driver 128 to the packet interface 104 typically require either no specific response or an asynchronous response that is generated at a later time (with no need to correlate with an original request). The packet interface 104 can generate asynchronous notifications which are unrelated to any command.

Messages can be sent across a networked architecture such as that shown in FIG. 2 via sockets, datagram, or other communication means. In that event, additional header information can be added onto the message. For example, the message can include a protocol stack including transmission control protocol (TCP) header information, Internet protocol (IP) header information, and ethernet header information.

Figure 5:
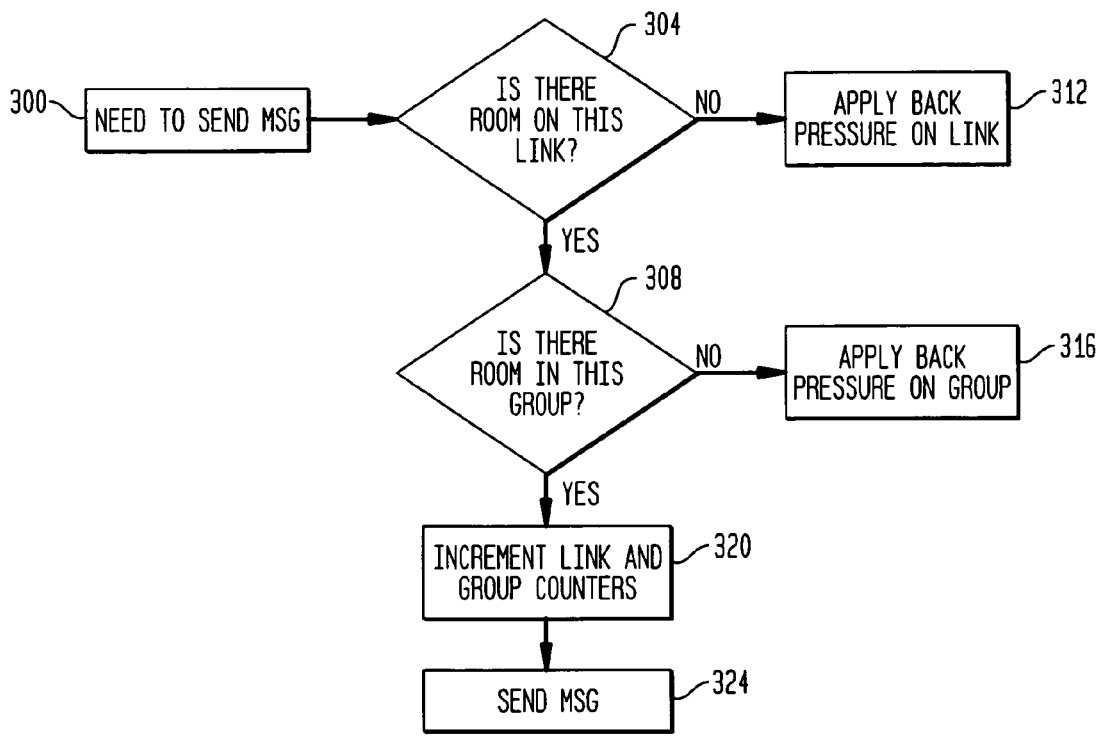
FIG. 5 is a flow schematic of the process used by the packet control driver to send a message to the packet interface.
Figure 6:
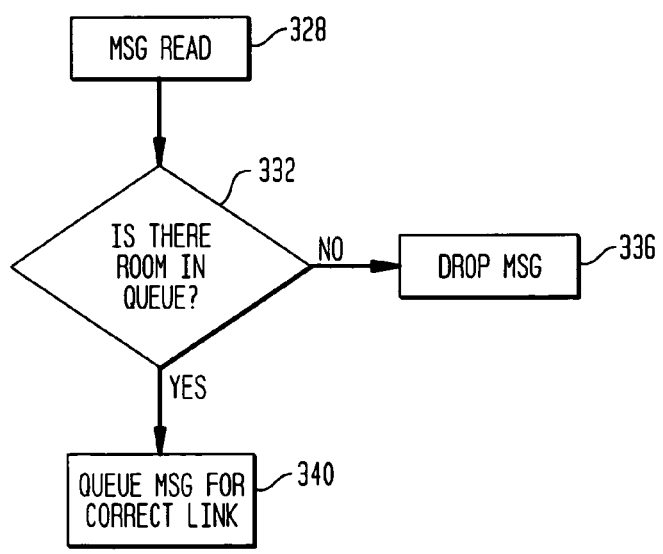
FIG. 6 is a flow schematic of the process used by the packet interface when a message is received.

FIGS. 5 and 6 depict certain of the steps performed when a message or packet is transmitted by the packet control driver 100 to the packet interface 104 via the network line 108. Referring to FIG. 5, the controller 100 in box 300 receives a message (e.g., information relating to an incoming request, command, maintenance, etc.) from another computational component (e.g., another part of the controller 100 such as a cell processor, endpoint manager, or resource controller). In response, the processor 112 needs to forward the message to the packet interface 104.

The flow control mechanism limits the number of downlink packets queued in LAPD for a selected link. Thus, the flow control mechanism does not allow the packet control driver to send packets to the packet interface if there is insufficient buffer 152 space to receive the packets. This is done by having the packet control driver 128 keep track of the number of unacknowledged packets that have been sent on both a link-by-link basis and for an entire instance of the packet interface 104 (or grouping of links).

Referring again to FIG. 5. in decision diamonds 304 and 308, the processor 112 determines if there is sufficient room in the buffer 152 space allocated to a specific link 164 from the packet interface 104 to a telephone 160 and to a grouping of links (containing the specific link) to hold the message. As will be appreciated, links are grouped together by type to permit buffer sharing. The determination is typically done by examining counters 132 stored in memory 120. Counters 132 include a link flow control counter corresponding to the buffer space allocated to the specific link 164 and a link grouping flow control counter corresponding to the buffer space allocated to the grouping of links 164 (of which the specific link 164 is a part). Typically, the counters 132 stored in memory 120 indicate a buffer memory capacity that is in use by the link or grouping of links, as appropriate. Accordingly, the processor 112 compares the memory requirement for the message with the allocated (unused) buffer memory capacity for each of the link 164 and grouping of links. If there is not sufficient freed buffer capacity for the link or grouping of links, the processor 112 applies respectively in boxes 312 and 316 back pressure on another computational component, such as another software component of the controller 100 respecting the link 164 or/and grouping of links. This is typically done by sending an appropriate message to another part of controller 100. If there is sufficient unused memory capacity allocated to both the link and grouping of links to hold the message, the processor 112 in box 320 increments (by the same amount) the link and link grouping flow control counters (to reflect the memory capacity to be used by the message) and then in box 324 sends the message to the packet interface 104. As will be appreciated, the amount by which the counters are incremented is directly related to the buffer memory capacity to be used by the message.

The packet control driver 128 is unable to send packets to the packet interface 104 unless the number of unacknowledged packets is less than the total buffer 152 space available. Accordingly, buffer sharing can be set up to allow a link specified by link type to use any percentage of the total available buffer space. "Link type" refers to a group of links that have the same specific set of control parameters.

After receiving the message in box 328, the firmware processor 116 in the packet interface 104 determines in decision diamond 332 of FIG. 6 whether there is room in the allocated portion(s) of buffer 152 memory for the message. If not, the processor 116 drops the message in box 336. The processor 116 sends a message back to the packet control driver 128 indicating that the message or packet was dropped. If there is room in the buffer 152, the processor 116 in box 340 queues the message in the queue 156 for the specific link 164. The packet interface holds the message in the queue 156 until an ack (or acknowledge message or packet) is received from the respective telephone 160 on the link 164 that the message has been processed.

Figure 7:
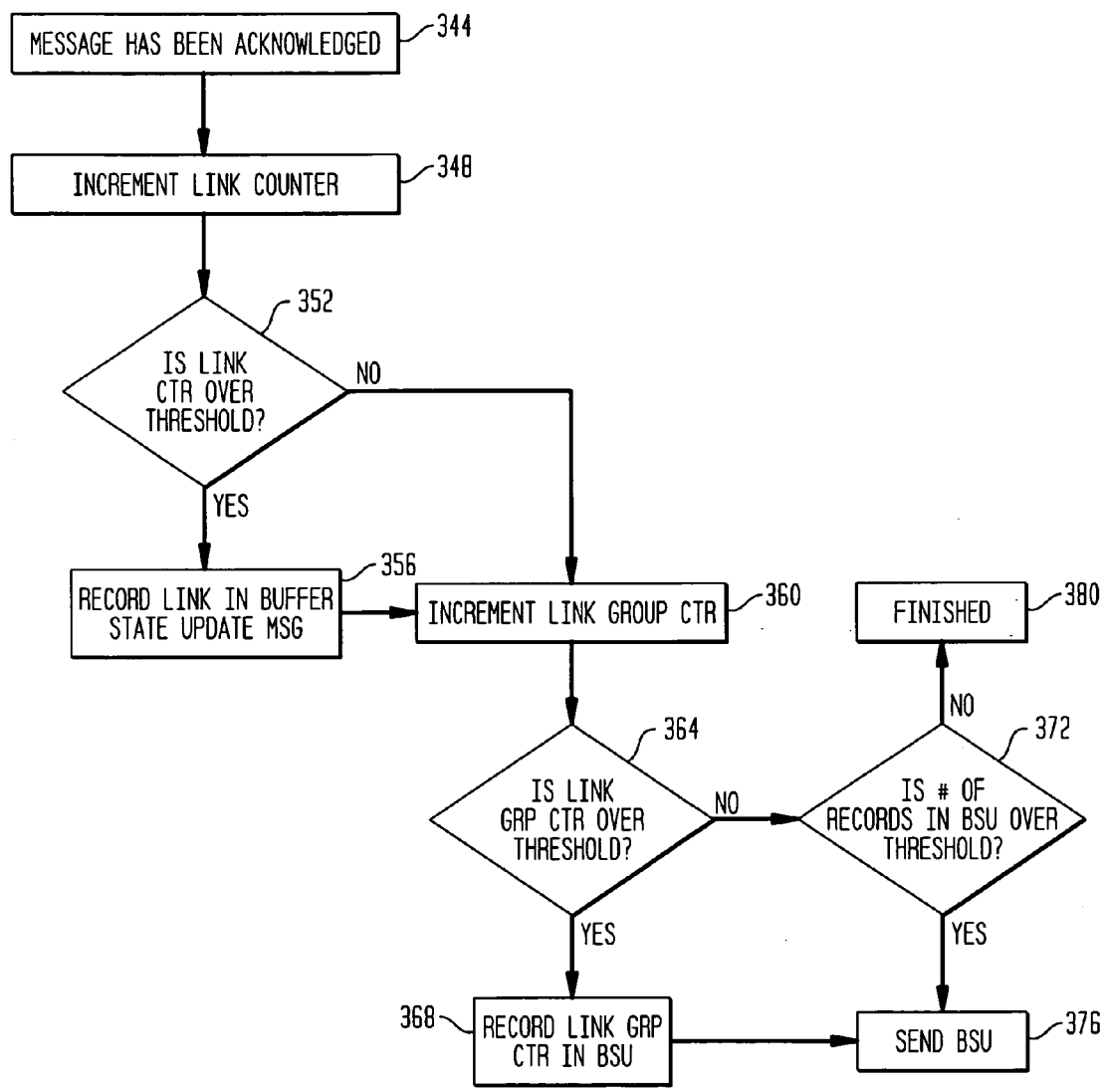
FIG. 7 is a flow schematic of the process used by the packet interface to forward buffer state update messages to the packet control driver.

Referring to FIG. 7 when the message has been acknowledged in box 344, the firmware processor 116 in the packet interface 104 increments in box 348 the link flow control counter (for that specific link) in the counters 144 to free the pertinent amount of buffer space. Indecision diamond 352, the processor 116 determines if the link flow control counter is equal to or greater than a predetermined first threshold. If so, the processor 116 in box 356 records the link in a buffer status update.

Figure 4:
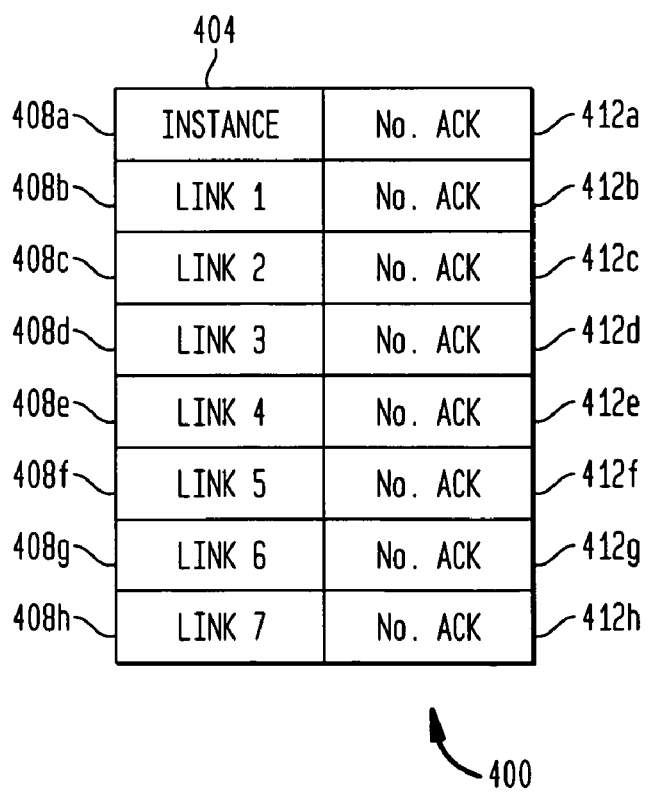
FIG. 4 depicts the format of a buffer update status message.

Referring to FIG. 4, the buffer status update 400 is depicted. The update 400 (which is included in data field 232) includes an instance field 404 which identifies the grouping of links, and a plurality of link fields 408a–g each of which corresponds to a unique link. Each of the instance field and link fields has an ack field 412g–h which indicate a number of ack's that have been received for the item identified in the corresponding field since the last packet including a buffer status update was transmitted. The update 400 can further have a corresponding record field (not shown) indicating the number of records contained by the packet. A record refers to a unique pairing of a specific instance or link field 404, 408 with a corresponding ack field 412. In the example shown, the record field would refer to eight records. The record field is typically contained in the future field 224 portion and the buffer status update information in the data field 232 portion of the message (FIG. 3). The first record in the packet is typically for the current link grouping of the packet interface.

Referring again to FIG. 7, the processor 116, after performing the action in box 356 or after determining in decision diamond 352 that the link flow control counter does not equal or exceed the first threshold, increments the link grouping flow control counter (for the link group containing the specific link)in box 360 in an amount that is related to the amount of buffer memory space formerly occupied by the message. In decision diamond 364, the processor 116 determines if the link grouping counter equals or exceeds a predetermined second threshold (that is typically different from the first threshold). The first and second thresholds are typically set such that there is no deadlock between the driver and interface (where the driver cannot send more messages and the interface needs more messages to send off a buffer status update packet). The maximum of the thresholds is determined by the size of the variables. If the counter equals or exceeds the threshold, the processor 116 in box 368 records the link grouping flow control counter in the buffer status update 400. If the counter is less than the threshold, the processor 116 determines in decision diamond 372 if the number of records in the buffer status update is equal to or exceeds a predetermined third threshold (which typically differs from the first and second thresholds). This query reflects the fact that there is a limit on the number of records that can be grouped in a single buffer status update packet. If the number equals or exceeds the third threshold or if the processor 116 performed the action in box 368, the processor 116 forwards in box 376 a message containing the buffer status update to the packet control driver 128. If not, the processor 116 awaits in box 380 the receipt of another ack from a telephone 160. The first, second, and third thresholds are typically provided to the interface 104 by the driver 100 during initialization.

As will be appreciated from the foregoing, the process of FIG. 7 provides an efficient buffer management or sharing method. When a specified number of ack's have been received either for an individual link or the grouping of links as a whole, a record is created in a status buffer update 400. As soon as enough records are in the update, a packet containing the update 400 is forwarded to the packet control driver 128 informing the driver 128 of the newly available buffer space.

Figure 8:
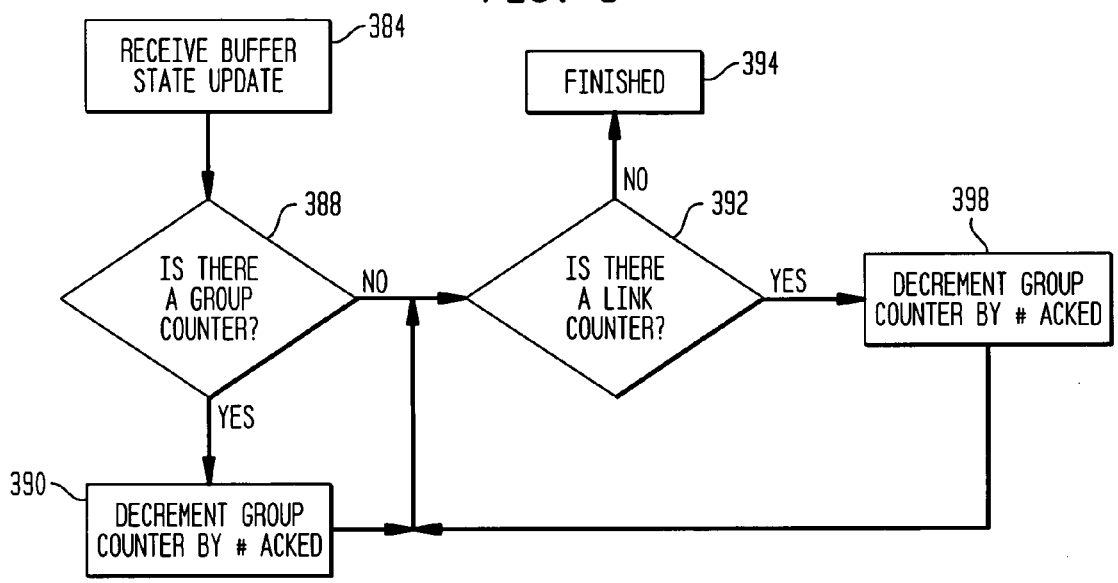
FIG. 8 is a flow schematic of the process used by the packet control driver when a buffer state update message is received from the packet interface.

Referring to FIG. 8 when the driver 128 in box 384 receives the message or packet, the processor 112 first determines in decision diamond 388 whether there is a link grouping flow control counter in the packet. If so, the processor 112, decrements in box 390 the corresponding link grouping flow control counter in memory 120 by the number of ack's in the pertinent ack field (which is the number of ack packets received since the last buffer status update message). If not or after performing box 390, the processor 112 determines in decision diamond 392 if there is a link flow control counter in the packet. If not, the processor 112 waits in box 394 for the next update packet to be received. If the packet contains a link flow control counter or if the processor 112 performs the action in box 398, the processor 112 decrements the pertinent link flow control counter by the number of ack's in the counter's corresponding ack field (which is the number of ack packets received since the last buffer status update message). The processor 112 proceeds to decision diamond 392 to determine if there is another link flow control counter in the packet. As will be appreciated, the link and link grouping flow control counters in memory 120 differ from those in memory 124. Specifically, the flow control counters in memory 120 signify the amount of buffer space in use by the corresponding link or grouping of links while the flow control counters in memory 124 signify the amount of free buffer space allocated to the corresponding link or grouping of links. More specifically, the driver's flow control counters record the number of unacknowledged messages sent to the buffer while the interface's flow control counters record the number of acknowledged messages sent to the buffer.

As can be seen from the above discussion, the packet interface 104 does not typically perform any buffer management. The interface's primary responsibility is to send packets out and when enough are acked, inform the driver 128. This helps to reduce the amount of workload on the interface 104 and allows the interface 104 to handle a higher load of traffic and/or have a lower processing capacity. This further allows the driver 128 to alter the driver's buffer sharing polices over time and provides the driver 128 with full control over the flow control mechanism.

To help maintain the driver's counters 132 and the actual number of free buffers in the packet interface in sync, a flow control maintenance command is sent by the driver 128 to the packet interface 104. When the packet interface 104 receives this command, the interface 104 will send off a packet containing a buffer status update with the most current acked counters. The interface 104 will then send a response with the current number of buffers in use. The driver uses this information to ensure that the driver's flow control counters match the actual usage of the buffer space.

The foregoing features permit a second embodiment of the invention depicted in FIG. 9 to be created. In the second embodiment, the controller 100 is networked-via network lines 108*a–n* with a plurality of packet interfaces 104*a–n*. Each of the plurality of packet interfaces 104*a–n* is connected to a plurality of telecommunication devices 160*a–n* (which are shown as telephones for illustration purposes only) via interfaces 200*a–n*. Each of the interfaces 104*a–n* include the components of FIG. 2 (e.g., packet bus, memory board(s), and LAPD links). Each packet interface can be further connected to a PRI trunk and/or one or more other boards as shown in FIG. 2. In this manner, the controller 100 can control a plurality of packet interfaces 104*a–n* located at a variety of different geographic locations (e.g., via a LAN or WAN). This architecture therefore provides significant cost savings relative to conventional systems which would route all communications through a single packet interface.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. By way of example, the flow control counters in the memory 120 could refer to freed buffer space while those in the memory 124 refer to the buffer space in use. The software of FIG. 7 could be modified so that the threshold must be exceeded in boxes 352, 364, and/or 372 and if the threshold is met, the condition of boxes 352, 364, and/or 372 would not be satisfied. The embodiments described herein above are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method for operating a telecommunications system, comprising:
   receiving a message from a telecommunication component;
   determining whether a memory capacity assigned to a grouping of links is sufficient to contain the message; and
   transmitting the message when the memory capacity is sufficient to contain the message.

2. The method of claim 1, further comprising:
   determining whether a memory capacity assigned to a link is sufficient to contain a message;
   transmitting the message when both the memory capacity assigned to the grouping of links and the memory capacity assigned to the link are each sufficient to contain the message; and
   applying back pressure to the telecommunication component when at least one of the memory capacity assigned to the grouping of links and the memory capacity assigned to the link are insufficient to contain the message.

3. The method of claim 2, further comprising incrementing a link counter related to the link and a group counter related to the grouping of links when both the memory capacity assigned to the grouping of links and the memory capacity assigned to the link are each sufficient to contain the message.

4. A telecommunications system, comprising:
   receiving means for receiving a message from a telecommunication component;
   determining means for determining whether a memory capacity assigned to a grouping of links is sufficient to contain the message;
   transmitting means for transmitting the message when the memory capacity is sufficient to contain the message.

5. The system of claim 4, further comprising:
   determining means for determining whether a memory capacity assigned to a link is sufficient to contain a message;
   transmitting means for transmitting the message when both the memory capacity assigned to the grouping of links and the memory capacity assigned to the link are each sufficient to contain the message; and
   applying means for applying back pressure to the telecommunication component when at least one of the memory capacity assigned to the grouping of links and the memory capacity assigned to the link are insufficient to contain the message.

6. The system of claim 4, further comprising incrementing means for incrementing a link counter related to the link and a group counter related to the grouping of links when both the memory capacity assigned to the grouping of links and the memory capacity assigned to the link are each sufficient to contain the message.

7. A method for operating a telecommunications system, comprising:
   determining whether a counter is the same as or exceeds a predetermined level, the counter being related to a memory capacity of a computational component;
   when the counter is the same as or exceeds the predetermined level, transmitting an update message to a second computational component; and
   when the counter is not the same as or in excess of the predetermined level, delaying the transmission of the update message to the second computational component.

8. The method of claim 7, further comprising before the determining step receiving an acknowledge message from a telecommunications device.

9. The method of claim 7, wherein the counter includes at least one of a group counter related to a grouping of links and a link counter related to a specific link and the group counter tracks a memory capacity assigned to the grouping of links and the link counter a memory capacity assigned to the specific link.

10. The method of claim 7, wherein the counter includes at least one of a group counter related to a grouping of links and a link counter related to a specific link and the group counter tracks a memory capacity assigned to the grouping of links and the link counter a memory capacity assigned to the specific link and further comprising incrementing or decrementing the counter to indicate an unused portion of the memory capacity.

11. A telecommunications system, comprising:
    determining means for determining whether a counter is the same as or exceeds a predetermined level, the counter being related to a memory capacity of a computational component;
    transmitting means for transmitting an update message to a second computational component, when the counter is the same as or exceeds the predetermined level; and
    delaying means for delaying the transmission of the update message to the second computational component when the counter is not the same as or in excess of the predetermined level.

12. The system of claim 11, further comprising receiving means for receiving an acknowledge message from a telecommunications device.

13. The system of claim 11, wherein the counter includes at least one of a group counter related to a grouping of links and a link counter related to a specific link and the group counter tracks a memory capacity assigned to the grouping of links and the link counter a memory capacity assigned to the specific link.

14. The system of claim 13, further comprising means for incrementing or decrementing the counter to indicate an unused portion of the memory capacity.

15. A communications system, comprising:
    a controller for controlling a plurality of telecommunications subsystems, each telecommunications subsystem including:
    a plurality of telecommunications devices and
    one or more communication interfaces for interfacing between the plurality of telecommunication devices and the controller;
    a communication line connecting the controller with each of the telecommunications subsystems to form a network;
    a first memory accessible by the controller, the memory including one or more flow control counters; and
    a second memory accessible by a processor in the communication interface, the second memory including one or more buffer status counters.

16. The system of claim 15, wherein the one or more flow control counters indicate one of a memory capacity in use and a free memory capacity and the one or more buffer status counters indicate the other of the one of a memory capacity in use and a free memory capacity.

17. A method for managing a telecommunications system, comprising:
    receiving a message; and
    at least one of incrementing or decrementing a counter in response to the message, the counter being related to the capacity of a memory accessed by a telecommunications component, wherein the counter includes at least one of a group counter related to a grouping of links and a link counter related to a specific link, and the group counter tracks a memory capacity assigned to the grouping of links and the link counter a memory capacity assigned to the specific link.

18. A computer readable medium comprising instructions to perform the steps of claim 17.

19. A telecommunications system, comprising:
    receiving means for receiving a message; and
    processing means for at least one of incrementing or decrementing a counter in response to the message, the counter being related to the capacity of a memory accessed by a telecommunications component, wherein the counter includes at least one of a group counter related to a grouping of links and a link counter related to a specific link and the group counter tracks a memory capacity assigned to the grouping of links and the link counter a memory capacity assigned to the specific link.

20. A method for operating a telecommunications system, the system comprising a controller, one or more telecommunication devices, and a communication interface positioned between and in communication with the controller and the one or more telecommunication devices, comprising:
    (a) the controller determining whether at least one selected buffer maintained by the communication interface has sufficient available capacity to buffer a message;
    (b) when the at least one selected buffer has sufficient available capacity, performing the substeps of:
        (B1) the controller transmitting the message to the communication interface; and (c) when the at least one selected buffer does not have sufficient available capacity, the controller not currently transmitting the message to the communication interface.

21. The method of claim 20, wherein the message comprises a message identifier identifying the at least one selected buffer in the communication interface, the message identifier identifies at least one of a type and index corresponding to the message, and wherein step (b) comprises the further substep of:
(B2) the communication interface writing the message to the at least one selected buffer.

22. The method of claim 21, wherein the message identifier identifies one of a flow control message, a fault code message, a counter value message, an initialization message, a link update message, a command message, a response message, and a control message.

23. The method of claim 22, wherein the message identifier identifies a flow control message and the flow control message comprises a plurality of: a record field set to a number of update records held by the message, a link and/or link grouping identifier identifying a set of links between the one or more telecommunication devices and the interface, and an acknowledge field including a number of packets that have been acknowledged for the link identifier since a last flow control message was transmitted and/or received.

24. The method of claim 22, wherein the message identifier identifies a counter value message requesting a counter value and wherein the counter value is related to at least one of the memory capacity of the communication interface and a set of links between the one or more telecommunication devices and the interface.

25. The method of claim 20, wherein the controller is a packet control driver in a telecommunications switch and the communication interface is a packet interface and the determining step comprises:
tracking a number of unacknowledged messages transmitted by the controller to the communication interface.

26. The method of claim 20, wherein the one or more telecommunication devices is a plurality of telecommunication devices, a plurality of links of different types connect the telecommunication devices to the communication interface, the links being grouped into a number of link sets, each link set comprising at least one member, space in the buffer is divided among the plurality of link sets, and the determining step comprises the substep of:
(A1) examining a flow control counter, each flow control counter corresponding to the portion of buffer space allocated to a corresponding link set.

27. The method of claim 26, wherein the flow control counter is related to an unused buffer space portion.

28. The method of claim 26, wherein the flow control counter is related to a used buffer space portion.

29. The method of claim 27, wherein the examining step comprises:
the controller comparing the memory required for the message with the flow control counter.

30. The method of claim 26, wherein step (b) is performed and comprises the substep of:
(B3) the controller one of incrementing and decrementing a flow control counter to reflect the buffer space occupied by the transmitted message.

31. The method of claim 30, wherein step (b) is performed and an acknowledge is received by the controller and further comprising:
(d) the controller the other one of incrementing and decrementing a flow control counter to reflect that the buffer space formerly occupied by the message is available.

32. The method of claim 26, wherein the flow control counter comprises a link flow control counter corresponding to a first buffer space allocated to a first link set comprising a selected link and a link grouping flow control counter corresponding to a second buffer space allocated to a second link set comprising plurality of links of the same type.

33. The method of claim 30, wherein an amount by which the flow control counter is incremented or decremented is directly related to a buffer memory capacity to be used by the message.

34. The method of claim 26, wherein the controller maintains a first flow control counter set and the interface maintains a second flow control counter set, wherein each of the flow control counters in the first flow control counter set signifies an amount of buffer space in use by a corresponding link set, and wherein each of the flow control counters in the second flow control counter set signifies an amount of buffer space allocated to a corresponding link set.

35. The method of claim 34, wherein each of the flow control counters in the first flow control counter set are related to a number of unacknowledged messages sent to the buffer of the interface and each of the flow control counters in the second flow control counter set are related to a number of acknowledged messages sent to the interface's buffer.

36. A computer readable medium comprising instructions to perform the steps of claim 20.

37. A telecommunications system, comprising:
a controller for controlling a plurality of telecommunications subsystems, each telecommunications subsystem including:
at least one telecommunication device and
at least one communication interface for interfacing between the at least one telecommunication device and the controller; and
a communication line connecting the controller with each of the telecommunications subsystems to form a network, wherein the controller is operable to perform the following operations:
(i) determine whether a memory of the communication interface has sufficient available capacity to store the message;
(ii) when the memory has sufficient available capacity, transmit a message to the communication interface; and
(iii) when the memory does not have sufficient available capacity, not currently transmit the message to the communication interface.

38. The system of claim 37, wherein the memory is at least one selected buffer, the message comprises a message identifier identifying the selected buffer in the communication interface, and the message identifier identifies at least one of a type and index corresponding to the message.

39. The system of claim 38, wherein the message identifier identifies one of a flow control message, a fault code message, a counter value message, an initialization message, a link update message, a command message, a response message, and a control message.

40. The system of claim 39, wherein the message identifier identifies a flow control message and the flow control message comprises a plurality of: a record field set to a number of update records held by the message, a link and/or link grouping identifier identifying a set of links between the one or more telecommunication devices and the interface, and an acknowledge field including a number of packets that have been acknowledged for the link identifier since a last flow control message was transmitted and/or received.

41. The system of claim 39, wherein the message identifier identifies a counter value message requesting a counter value and wherein the counter value is related to at least one of the memory capacity of the communication interface and a set of links between the one or more telecommunication devices and the interface.

42. The system of claim 39, wherein the controller is a packet control drive in a telecommunications switch and the interface is a packet interface and wherein the determining operation comprises the suboperation of:
tracking a number of unacknowledged messages transmitted by the controller to the communication interface.

43. The system of claim 38, wherein the at least one telecommunication device is a plurality of telecommunication devices, a plurality of links of different types connect the telecommunication devices to the communication interface, the links being grouped into a plurality of link sets, each link set comprising at least one member, space in the buffer is divided among the plurality of link sets and the determining operation comprises the suboperation of:
examining a flow control counter, each flow control counter corresponding to the portion of buffer space allocated to a corresponding link set.

44. The system of claim 43, wherein the flow control counter is related to an unused buffer space portion.

45. The system of claim 43, wherein the flow control counter is related to a used buffer space portion.

46. The system of claim 44, wherein the examining operation comprises the suboperation of:
comparing the memory required for the message with the control counter.

47. The system of claim 46, wherein operation (ii) is performed and comprises the suboperation of:
one of decrementing and incrementing a flow control counter to reflect the buffer space occupied by the transmitted message.

48. The system of claim 47, wherein an acknowledge is received by the controller and the controller being further operable to the other one of decrement and increment a link flow control counter to reflect that the buffer space formerly occupied by the message is available.

49. The system of claim 43, wherein the flow control counter comprises a link flow control counter corresponding to a first buffer space allocated to a first link set comprising a selected link and a link grouping flow control counter corresponding to a second buffer space allocated to a second link set comprising plurality of links of the same type.

50. The system of claim 47, wherein an amount by which the flow control counter is incremented or decremented is directly related to a buffer memory capacity to be used by the message.

51. The system of claim 43, wherein the controller maintains a first flow control counter set and the interface maintains a second flow control counter set, wherein each of the flow control counters in the first flow control counter set signifies an amount of buffer space in use by a corresponding link set, and wherein each of the flow control counters in the second flow control counter set signifies an amount of buffer space allocated to a corresponding link set.

52. The method of claim 51, wherein each of the flow control counters in the first flow control counter set are related to a number of unacknowledged messages sent to the buffer of the interface and each of the flow control counters in the second flow control counter set are related to a number of acknowledged messages sent to the interface's buffer.

* * * * *